(12) United States Patent (10) Patent No.: US 8,484,659 B2
Davies et al. (45) Date of Patent: Jul. 9, 2013

(54) DISTRIBUTED PROCESSING OF BINARY OBJECTS VIA MESSAGE QUEUES INCLUDING A FAILOVER SAFEGUARD

(75) Inventors: Paul J. Davies, Oakville (CA); Nouman Zaheer, Mississauga (CA); Steven Lloyd Crozier, Toronto (CA)

(73) Assignee: Management Systems Resources, Inc., Toronto, Ontario (CA)

( * ) Notice: Subject to any disclaimer, the term of this patent is extended or adjusted under 35 U.S.C. 154(b) by 516 days.

(21) Appl. No.: 12/763,820

(22) Filed: Apr. 20, 2010

(65) Prior Publication Data

US 2011/0258638 A1 Oct. 20, 2011

(51) Int. Cl.
*G06F 9/54* (2006.01)

(52) U.S. Cl.
USPC .......................................................... 719/314

(58) Field of Classification Search
USPC .......................................................... 719/314
See application file for complete search history.

(56) References Cited

U.S. PATENT DOCUMENTS

| | | | |
|---|---|---|---|
| 7,502,745 B1 * | 3/2009 | Shawver et al. ............... | 705/1.1 |
| 2002/0116248 A1 * | 8/2002 | Amit et al. ......................... | 705/9 |
| 2003/0115072 A1 * | 6/2003 | Manucha et al. .................. | 705/1 |
| 2003/0182406 A1 * | 9/2003 | Dick et al. ..................... | 709/221 |
| 2004/0122761 A1 * | 6/2004 | Thierer et al. ................... | 705/37 |
| 2009/0112771 A1 * | 4/2009 | Little ............................... | 705/59 |
| 2009/0125553 A1 * | 5/2009 | Dickinson .................. | 707/104.1 |
| 2009/0150370 A1 * | 6/2009 | Christensen et al. ............. | 707/5 |
| 2009/0271799 A1 * | 10/2009 | Barsness et al. .............. | 718/106 |
| 2010/0058355 A1 * | 3/2010 | Gernaey ......................... | 719/313 |
| 2011/0161959 A1 * | 6/2011 | Sharon et al. ................. | 718/101 |

OTHER PUBLICATIONS

Dickman, A., "Designing Applications with MSMQ: Message Queuing for Developers," (1998), Addison Wesley Longman, Inc.,pp. 172-179.*

Redkar, A.; Walzer, C.; Boyd, S.; Costall, R.; Rabold, K.; Redkar, T., "Pro MSMQ: Microsoft Message Queue Programming," (2004), Apress, pp. 235-268.*

* cited by examiner

*Primary Examiner* — H S Sough
*Assistant Examiner* — Brian W Wathen
(74) *Attorney, Agent, or Firm* — Wong, Cabello, Lutsch, Rutherford, & Brucculeri, LLP (57) ABSTRACT

A system and method for distributing processing utilizing message queues as a method of distributing binary objects as "messages" and invoking the embedded logic of the received message to perform a portion of a distributed application is disclosed. More particularly, but not by way of limitation, a system and method for the integrated distribution and execution of objects as they are retrieved or extracted from a message queue on a remote system to provide executable functionality portions of a distributed application. In one embodiment a failed processing step results in the message being retained in the message queue to allow for subsequent retry processing.

39 Claims, 10 Drawing Sheets

DISTRIBUTED PROCESSING OF BINARY OBJECTS VIA MESSAGE QUEUES INCLUDING A FAILOVER SAFEGUARD

FIELD OF THE DISCLOSURE

This disclosure relates generally to distributed processing utilizing message queues as a method of distributing binary objects as "messages" and invocation of the received message to perform a composite of distribution and remote execution. More particularly, but not by way of limitation, disclosed is a method, apparatus and system designed for the integrated distribution and execution of objects as they are retrieved or extracted from a message queue on a remote system to provide executable functionality portions of a distributed application.

BACKGROUND

Today's corporate computing environments rely on distributed processing of computer applications for many reasons. By distributing the workload among different types of computers and different types of computer environments certain efficiencies may be achieved by "distributed applications." However, distributed application processing is generally more complicated than writing a single application to execute locally on a single computer.

Some of the complexities of distributed processing systems include the need for a communication mechanism between the distributed portions of the distributed applications and maintenance of consistent, or at least compatible, versions of the distributed components. Communication solutions are available that may be implemented as part of an overall design architecture for a distributed computing system. Examples of how distributed computer components may communicate include remote procedure call (RPC), web services, and message queuing systems. Two examples of message queuing systems are Microsoft Message Queuing (MSMQ) available from Microsoft of Redmond, Wash. and IBM WebSphere MQ® available from International Business Machines (IBM) of Armonk, N.Y.

In either MSMQ or Websphere MQ "messages" are typically put onto a queue on one system and later retrieved from the queue on another system. The delay between send and receipt may be nearly instantaneous or may take time as determined by factors such as type of queue or queue priority. Messages on a queue typically include information to request an application (e.g., program) already installed on the receiving system to perform some task. Although messaging is typically used to communicate between different computer systems it is not only possible but reasonable in some cases to use a message queue for communication within a single computer system. As used herein, computer system refers to a logical embodiment of a computer. A logical embodiment of a computer is not limited to a physical machine and may include various forms of virtual machines. A virtual machine is a software implementation of a machine that executes programs like a physical machine (e.g., Logical Partition (LPAR) in a mainframe environment or implemented using virtualization software such as that available from VMware, Inc. of Palo Alto, Calif.)

Figure 1:
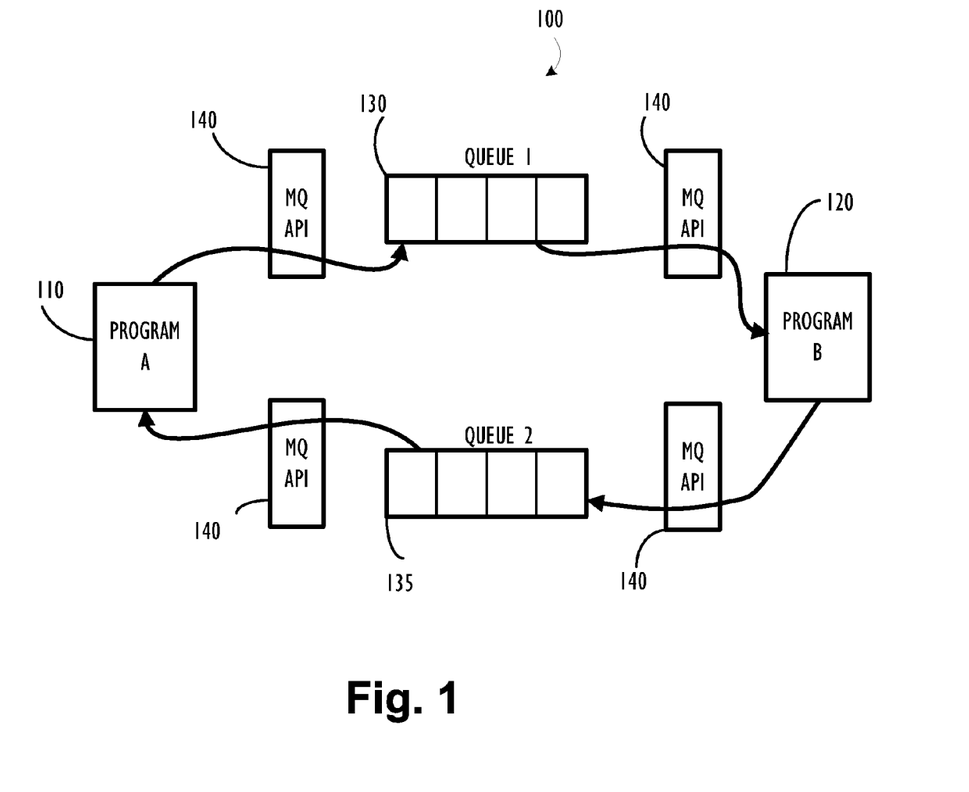
FIG. 1 shows a high level diagram 100 of a message queue for communication between two programs.

Referring to FIG. 1, a high level diagram 100 of a message queue communication system is shown. Message queuing is a method of program-to-program communication. Programs such as program A 110 and program B 120 within a distributed application communicate by writing and retrieving application-specific data (messages) to/from queues such as queue 1 130 and queue 2 135, without having a private, dedicated, logical connection link between the programs. Messaging means that programs communicate with each other by sending data in messages and not by calling each other directly. Queuing means that programs communicate through queues. Programs communicating through queues need not be executing concurrently. In one example of a message queue implementation, an application such as program B 120 can define a named message queue and then register as a software routine that "listens" for messages placed onto the queue. Additional programs may connect to the same named queue and submit messages to the queue. The queue-manager software such as WebSphere MQ and MSMQ store and transport the message as necessary until a receiving application connects and calls the registered software routine. The receiving application can then process the message as appropriate. Also, in the example of FIG. 1, program A 110 and program B 120 can be executing in the same computer system or different computer systems.

With asynchronous messaging, the sending program proceeds with its own processing without waiting for a reply to its message. In contrast, synchronous messaging waits for the reply before it resumes processing. For the user, the underlying protocol is transparent. The user is typically concerned with conversational or data-entry type applications.

WebSphere MQ is used in a client/server or distributed environment. Programs belonging to an application can run in one workstation or in different machines on different platforms. Because of a consistent queuing mechanism (shown as MQ API 140), applications can be supported by different systems and the programs can be written in various programming languages.

Because WebSphere MQ communicates via queues (130, 135) it can be referred to as using indirect program-to-program communication. The programmer cannot specify the name of the target application to which a message is sent. However, the programmer can specify a target queue name; and each queue may be associated with a program. An application can have one or more "input" queues and may have several "output" queues containing information for other servers to process or for responses for the client that initiated the transaction.

In general, the programmer does not have to worry about the target program being busy, not available or not currently connected to a common network. The program sends messages to a queue that is associated with an application; and the applications may or may not be available at the time of the request. WebSphere MQ takes care of the transport to the target applications and may even "trigger" the target application if necessary.

If the target program is not available, the messages may stay in a queue and get processed later. The holding queue may be on the sending machine, the target machine or even possibly some machine in between and may be determined based on current network connectivity to the target machine. Also, applications can be running all the time or they can be triggered, that is, automatically started when a message arrives or after a specified number of messages have arrived.

Diagram 100 of FIG. 1 shows an example of how two programs, A 110 and B 120 may communicate with each other using message queues 130 and 135. Collectively, programs A 110 and B 120 and possibly other programs make up a business application. Queue 130 represents an output queue for program A 110 and an input queue for program B 120. Similarly, queue 135 provides communication from B 120 to A 110. Each connection from a program to a queue is passed through an application program interface (API) 140.

A message typically consists of two parts. A data part that is sent from one program to another and a message descriptor part (e.g., message header). The message descriptor identifies the message (message ID) and contains control information, also called attributes, such as message type, expiry time, correlation ID, priority, and the name of the queue for any reply message. Data is information to direct the receiving program how to perform a next step of the distributed application processing (e.g., program arguments and/or data structures).

In addition to providing a distributed communication mechanism as part of system architecture at program design time, another problem of distributed processing systems occurs at run-time and exists throughout the lifecycle of a distributed business application. This second problem is a requirement that different (i.e., distributed) systems be able to execute identical or at least compatible versions of the components of a distributed application. That is to say, if all computers are installed with version 1 of a distributed application, care must be used when upgrading to version 2 of the same distributed application. The problem of maintaining compatible versions is increased if a single component is used by more than one distributed application because multiple applications may be affected when upgrading a first application on the same system. This symptom in one operating environment is often referred to as "dll-hell".

Because of these concerns and others, improvements to implementations of message queuing and techniques of maintaining consistent versions of distributed components may be desirable.

SUMMARY

Disclosed are embodiments of a Restricted Party Screening (RPS) computer system configured to execute a distributed application. Communications between programs of the distributed application are implemented at least in part via message queues. When preparing a message for transmission from a first program to a receiving computer system, the first program encapsulates program functionality into the data portion of a message. Upon delivery of the message to a message queue within the receiving computer system, the executable portion can be accessed in the message and executed as a function of a program or process on the receiving computer system. The receiving computer system can either receive the message from the message queue directly or access the data portion of the message without actually removing the message from the queue. In this manner it is possible to ensure a message is not removed from the queue until after successful completion of the distributed work function.

In other embodiments, when the receiving computer system is not initially successful in performing the distributed work function, the message function may be received by a program or process on the second computer system and "requeued" to a secondary error recovery queue for later processing. The embedded portion of the message should preferably include enough information so that deferred recovery execution does not require further information from either a user or the first program.

In preferred embodiments, options of the queuing system are set to allow messages to be retained in their respective queues even in the event of system failure or restart (e.g., saved in non-volatile storage). Further, the receiving computer system can be configured in such a manner that trigger capabilities of the message queuing system can be utilized to process the embedded logic of the message without requiring a separate "listener" program already be installed on the receiving computer system.

DETAILED DESCRIPTION

Disclosed are embodiments of a Restricted Party Screening (RPS) processing mechanism which is an example of a distributed application. RPS is required prior to authorizing an export of controlled goods (e.g., arms or munitions). RPS is used to screen all of the entities and contacts associated with a particular export transaction to verify that they do not have export restrictions placed upon them by a government agency. The screening result can display information including the person's name, company, address, country and their type of involvement in the transaction. Because of volume of requests and customer demands, prompt reply to authorization queries may be necessary. Audit trail activities and other lower priority "housekeeping" tasks may also be associated with a RPS request. Disclosed embodiments may create a reduced overhead by processing fast units of work and in parallel processing slower units of work in a non-blocking manner through the use of asynchronous message queue processing. The asynchronous decoupling of the core user requests into an immediately processed work unit (e.g., data query processing component) and a slower decoupled follow-up post processing activity allows for execution at different latencies in an attempt to optimize the application request. This division of work technique can prevent the initial application from waiting for an expected response and minimize the overall response processing time. RPS is used as a non-limiting example to provide context to illustrate aspects of this disclosure. However, aspects of this disclosure will be recognized to be generally applicable to any distributed application using messaging.

Preferred embodiments of RPS are explained in the context of MSMQ and other components available from Microsoft. This is not meant to imply that all aspects of this disclosure are limited in any way to specific capabilities being described in accordance with a Microsoft based implementation. One of ordinary skill in the art will understand that other operating systems may provide similar capabilities while imposing different implementation requirements and terminology. However, the conceptual translation of system requirements and terminology would not require undue effort to one of ordinary skill in the art.

Figure 2A:
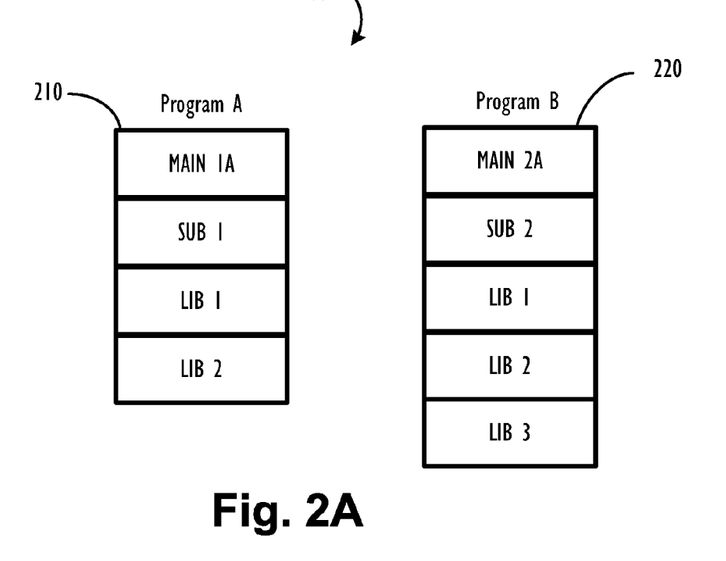
FIGS. 2A-B show, in block diagram form, different possible program structures with either completely imbedded components or with a mixture of imbedded components and references to external components.
Figure 2B:
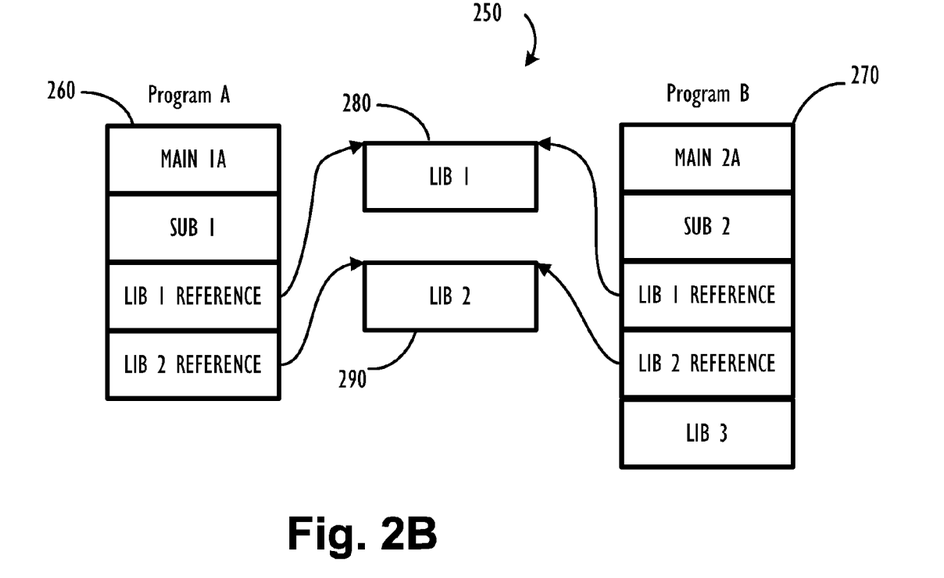

Referring now to FIGS. 2A-B, 2A shows a block diagram 200 of an executable structure for program A 210 and program B 220 with all program specific instructions (i.e., main, subroutines and libraries) embedded in a single executable file. FIG. 2B shows a block diagram 250 of an executable structure of the same programs A and B, however, this time the program has been built (i.e., linked) as reflected in 260 and 270 with references to external libraries (280 and 290) rather than libraries embedded. It is important to note that new program A 260 and new program B 270 now reference exactly the same executable code in lib 1 280 and lib 2 290. Because of this, if an update is made to a system configured as in diagram 250 to either lib 1 280 or lib 2 290 then both program A 260 and program B 270 can be simultaneously affected by the update. Further, as shown, references are to an executable library; however, it is also possible for a reference to point to a set of instructions which by themselves would not constitute an executable library. In this latter case, the subroutine could cause the execution of the set of instructions as if the instructions existed "in-line" with the code of the subroutine. Also, a program may have a combination of library references and embedded libraries as determined by the programmer when the program is designed and linked. These and many other implementations of including executable code at run-time of an application are known in the art.

Figure 3:
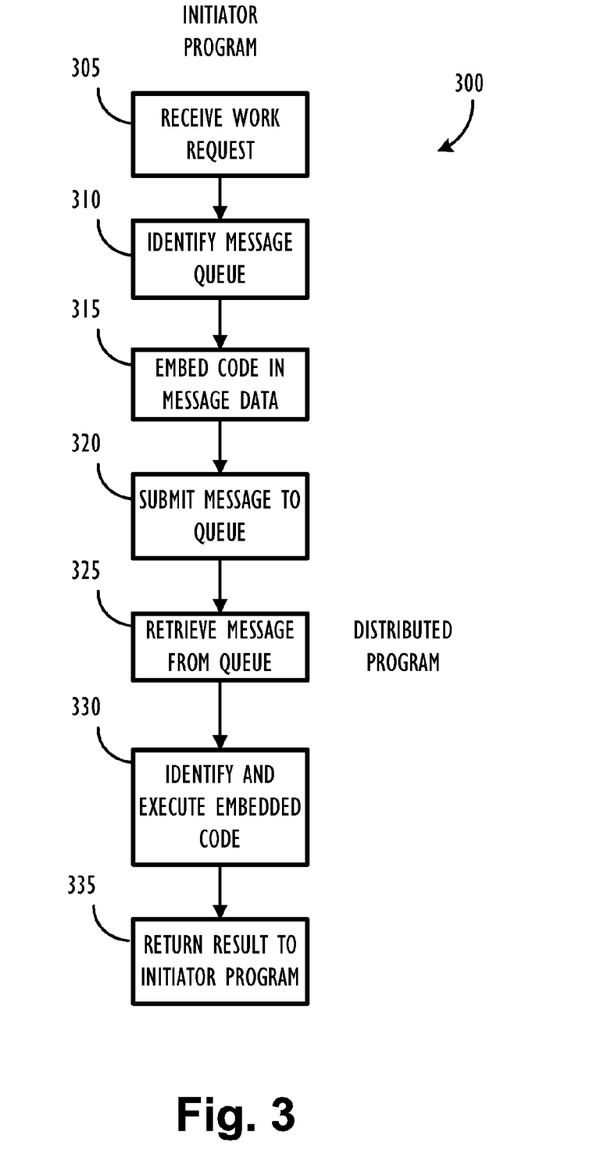
FIG. 3 shows, in flow chart form, one embodiment of embedding distributed executable code in message data.

Referring now to FIG. 3, a flow chart 300 is shown depicting an example process for creating and processing a message according to one disclosed embodiment. Beginning at block 305 an initiator program, which in this example is part of a distributed application, receives an input work request. The initiator program identifies a message queue associated with the type of request received at block 310. Next, at block 315 code representing either an instance of an object (e.g., for object oriented programming) or a subroutine/sub-function and data required for the code execution can be embedded in the data portion of the message and the message can be submitted to the message queue (320). On either this or a separate distributed system, another program or process may then access the message in the message queue (325). At block 330 the embedded code and any other information in the message may be identified and executed. In one embodiment a trigger and trigger rule can be used to initiate a process utilizing the embedded code portion of the message. As a result of this execution a result may be returned to the initiator program via a return queue as shown at block 335.

Figure 4:
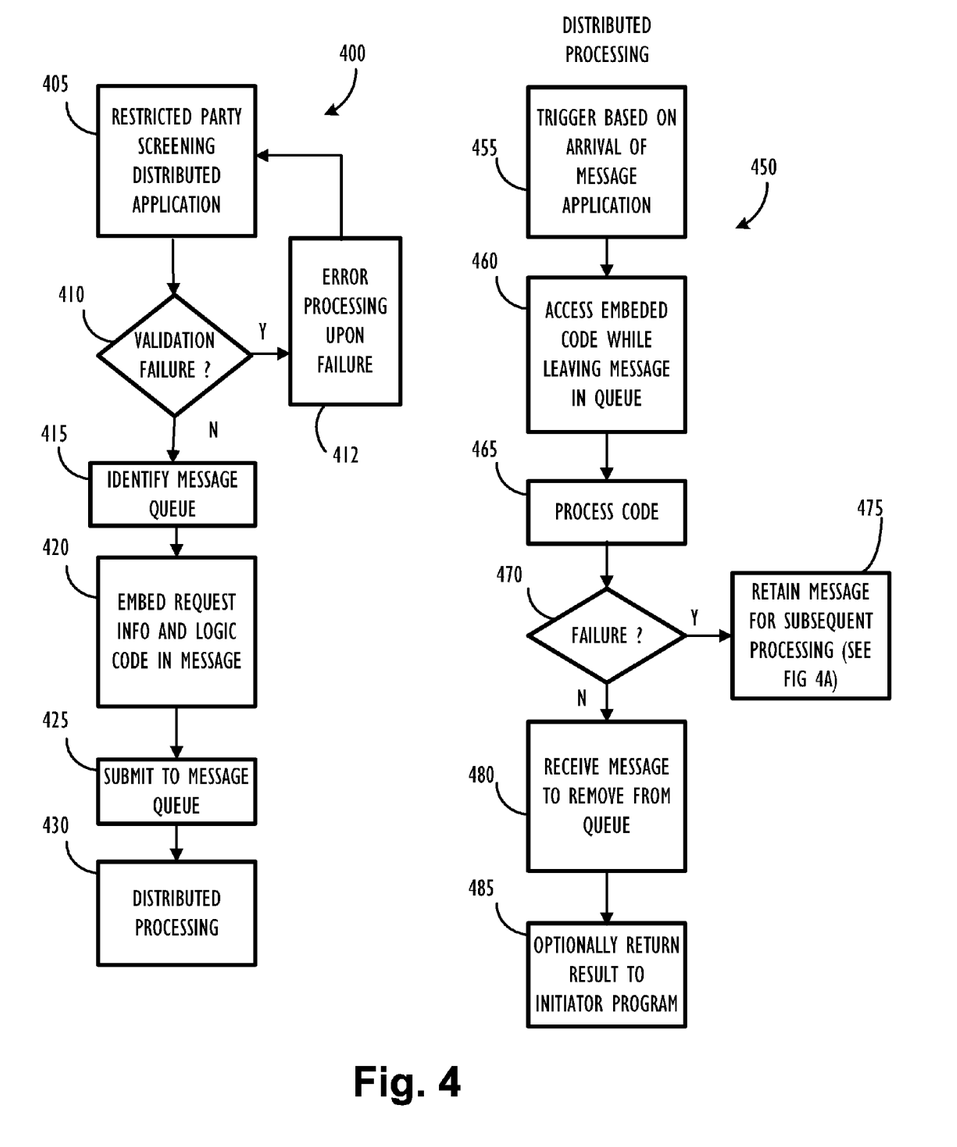
FIGS. 4 and 4A show, in flow chart form, a preferred embodiment of embedding distributed executable code and data into a message to further support recovery conditions.
Figure 4A:
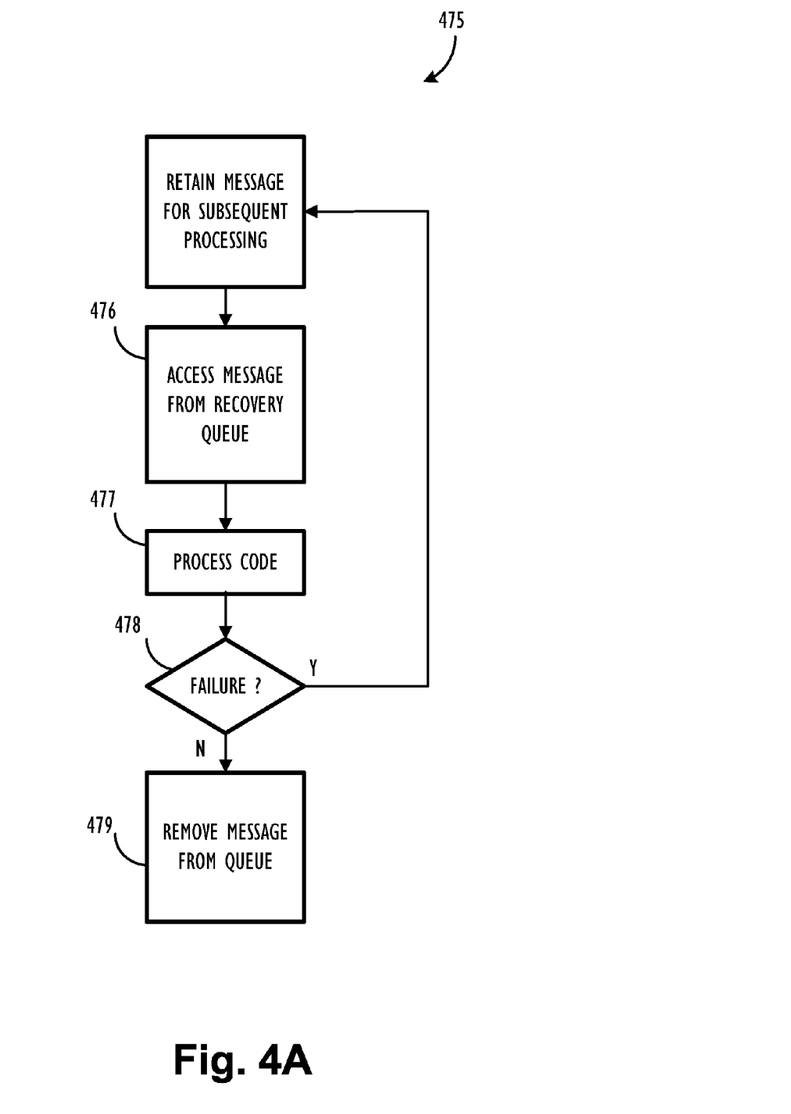
Figure 4B:
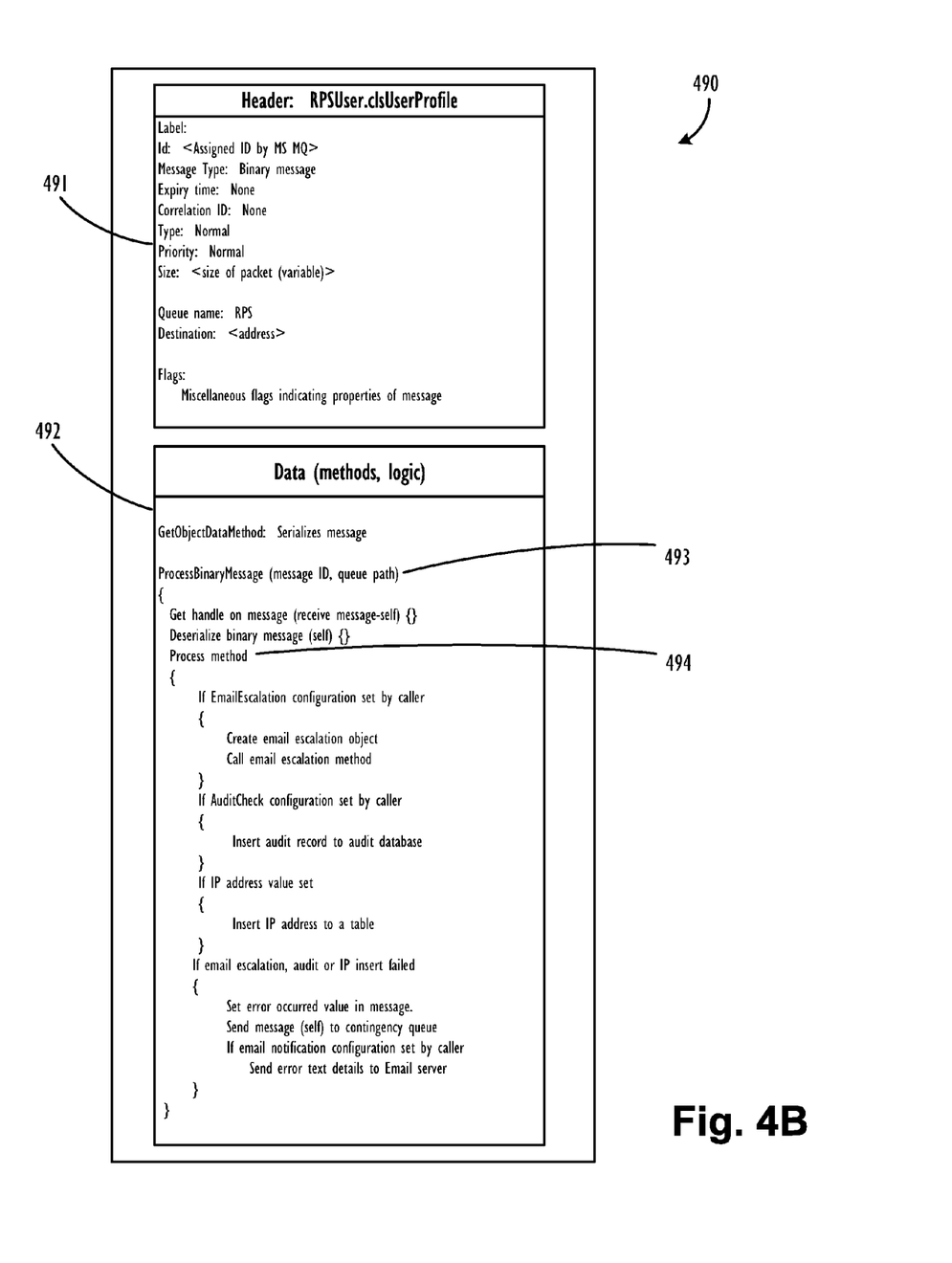
FIG. 4B shows, in block diagram form, an example message with self referencing encapsulated program logic.

Referring now to FIGS. 4A-B, processes 400, 450 and 476 show a preferred embodiment in the context of a RPS distributed application. Beginning at block 405 a RPS application receives a request to perform restricted party screening. Validation of input is performed at 410. Upon failure (the YES prong of 410) error processing is performed at block 412 and error information and control is returned to the initiating program for possible correction. If validation is not in error (the NO prong of 410) control is passed to block 415 where a message queue associated with a program or process for completing the validated request is identified. Next, at block 420 request information and logic code allowing for initial processing and possible further recovery (i.e., retry processing) can be embedded in the message and the message is submitted to the message queue (425) for distributed processing (430).

Distributed processing of block 430 is represented by process 450. Beginning at block 455, MSMQ or a similar messaging system receives the message at the target server and invokes (in this embodiment via a defined MSMQ trigger rule) an associated program or process. Once invoked, the associated program or process may use available interfaces to the messaging system to access the message while leaving the actual message on the queue (460). The embedded code can be executed at block 465. At 470 a determination of success or failure may be performed. Upon processing failure (the YES prong of block 470) the message may be retained in the same message queue or transferred to a recovery queue for subsequent processing 475 (e.g., retry at a later time as shown in FIG. 4A). Upon processing success (the NO prong of block 470) the message may be removed from the queue because it is no longer needed (480) and a result may be optionally returned to the initiator program (485). In one embodiment, the logic of the message itself determines when to effectively remove itself from the queue.

Referring now to FIG. 4A, an example of recovery queue processing 476 with a second program according to a preferred embodiment is shown. Because of a failure in initial processing it may be desirable to have a second "listener" style program or manual intervention be involved in the processing of the logic of the message. Continuing from block 475 of FIG. 4, a second program can receive the message from the recovery message queue. At block 477 the embedded code of the message can be processed. At block 478 it can be determined whether initial recovery processing is successful. For example, the second program can monitor the processing of the message in the recovery queue. If the processing is not successful (the NO prong of block 478) the message may be retained or resubmitted to the queue for further subsequent processing. If successful (the YES prong of block 478) the message may be received 479 to remove it from the recovery queue because it is no longer required. In one embodiment the logic of the message itself determines to place "itself" on the recovery message queue or to remove "itself" from the queue when successful.

Referring now to FIG. 4B, an example message 490 is shown as a block diagram. Message 490 consists of a message queue header 491 which defines properties of the associated message such as priority, message type, message identification, etc. Message 490 also contains data portion 492 which contains information provided for a receiving program or process. In a preferred embodiment, the message enters a message queue at the request of a first program. In the message queue implementation a message queue rule (R1) can be defined to be true whenever a message labeled and identified as a RPS message is received within the queue. A MSMQ trigger (T1) can also be pre-defined with a trigger condition that checks the MSMQ rule R1 value and a trigger-body that contains logic for invoking the ProcessBinaryMessage () method 493 in the data portion of message 490. When T1 fires (R1 is true), ProcessBinaryMessage () 493 is invoked and further program logic from the message, such as Process method 494, can be extracted and executed. Note, in this embodiment there is not a configured second program on the second computer system to "listen" for a message. The message is processed and the logic in the message is executed when the trigger T1 is fired because its trigger-condition, defined by R1, is true. Thus the receiving computer system is configured to use the message queue infrastructure of triggers themselves. This embodiment is advantageous because it does not require any pre-installed programs on the target or receiving system except the messaging system infrastructure of trigger support. MSMQ is a normal component of many Windows Server installations and includes the required trigger support. Further, because nothing application specific is pre-installed, there cannot be version mismatches and the proper version is always provided in the message. In addition, MSMQ used in conjunction with network load balancing provides a simple way to load balance many messages, which further enhances the value of not needing special pre-installed programs.

In other embodiments a second program may be configured in a standard manner to receive and "execute" messages as disclosed herein. The second program can further monitor the processing of the message in the recovery queue and augment the embedded logic of the message if necessary. In a preferred embodiment, the processing of the messages in the recovery queue can be performed with operator intervention to ensure system administrators are aware of required recovery processing.

Figure 5:
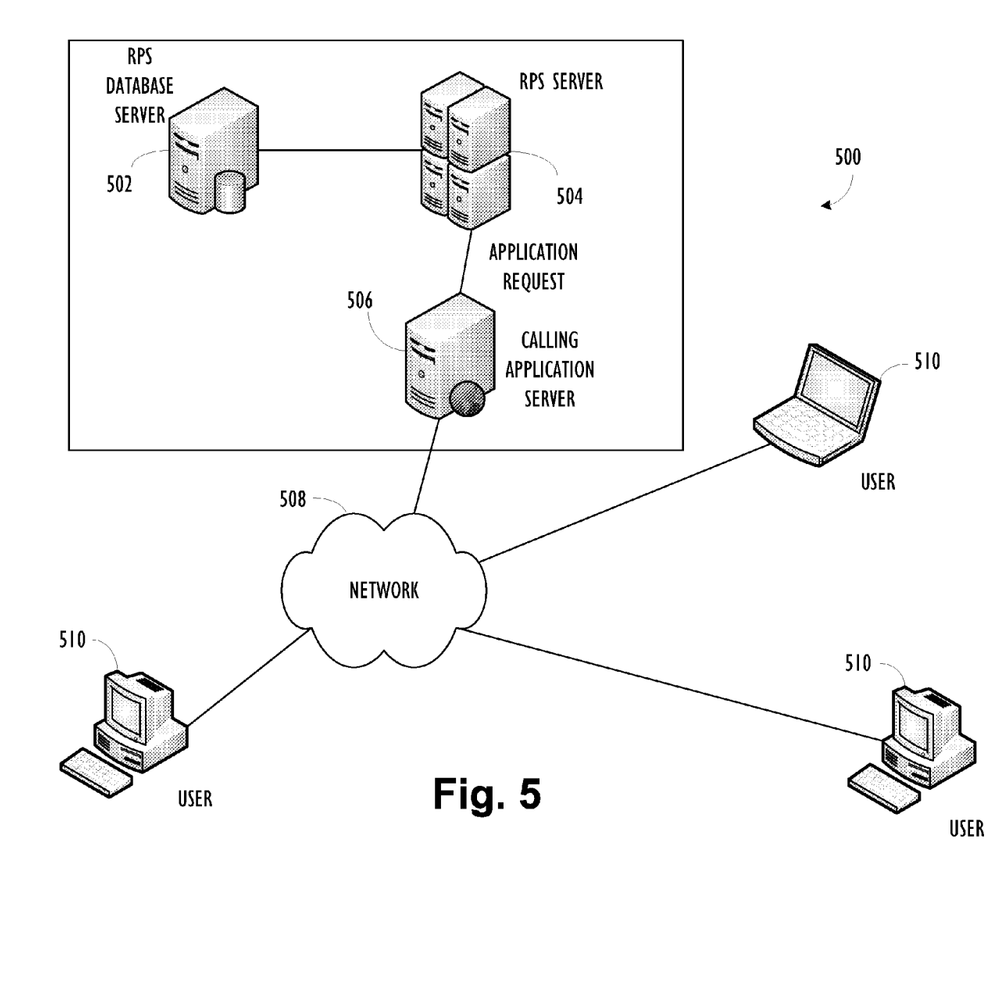
FIG. 5 shows, in block diagram form, a system 500 configured according to one disclosed embodiment.
Figure 6A:
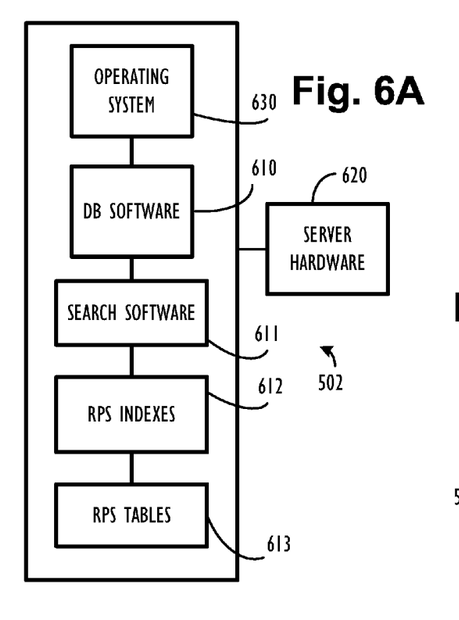
FIG. 6 shows, in block diagram form, selected components of individual computer systems from a preferred embodiment of a Restricted Party Screening (RPS) distributed application implementation.
Figure 6B:
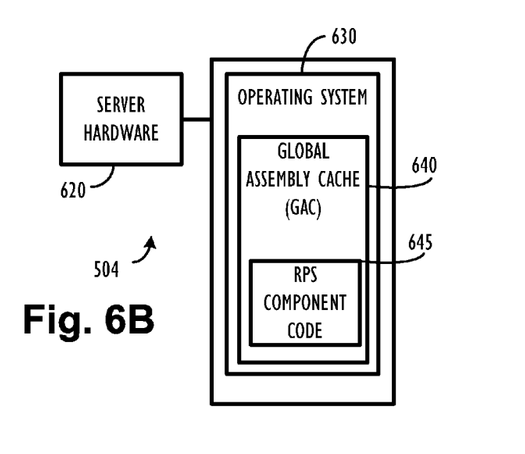
Figure 6C:
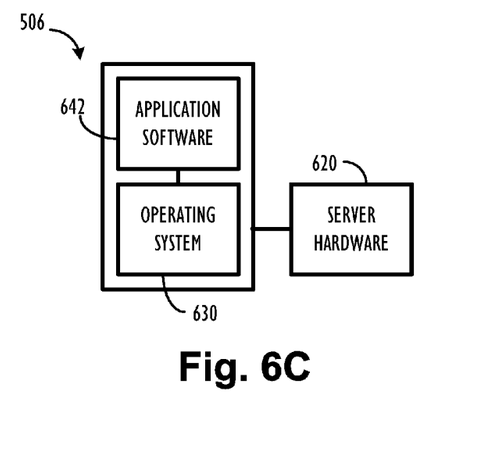
Figure 6D:
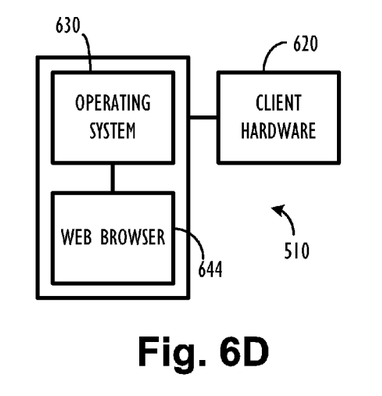

Referring now to FIG. 5, an example infrastructure implementation of an RPS system 500 is shown. In a preferred embodiment, the RPS system 500 may be implemented in a client-server, web based architecture and provided as an application service provider (ASP), software as a service (SaaS) model, or even hosted by a corporation using internal corporate infrastructure. Communication between computers depicted in FIG. 5 may be provided by any kind of computer network. The computer network may be either wired, wireless or a combination of both. Examples of computer networks include the Internet, an intranet, a local area network (LAN), a wide area network (WAN), or a combination of these and other network types.

The RPS system 500 can be hosted on a server system consisting of one or more computers in communication with each other. Collectively the servers perform the functions of a database server 502, an RPS instance on an application server 504 and an application server 506. Though illustrated as three separate computers, a greater or lesser number of computers can be utilized. Further, in preferred embodiments the RPS server 504 is a set of servers configured to host a distributed application using messaging between the programs of the distributed application.

Continuing with FIG. 5 and referring now to FIGS. 6A-D, each server and client is configured on server hardware 620 or client hardware 621 respectively and can carry out different logical portions of the overall functionality of RPS 500 as indicated by the example name of the servers (i.e., database server 502, core server 504 and application server 506). Application server 506 receives requests from clients 510 directed to a variety of interfaces (interfaces described more fully below in the context of FIG. 7). These application requests are then forwarded to RPS server 504. Requests are typically screening requests and RPS server 504 will interact with RPS database server 502 as necessary. Application server 506 may also perform initial validation checks prior to forwarding the request to the RPS server 504. In a preferred embodiment, servers 502, 504 and 506 run a Windows operating system (available from Microsoft Corporation, Redmond, WA.) and support "Assemblies" as a building block of applications. It is understood that this is exemplary and different operating systems 630 may also be used. RPS server 504 generally performs the relevant steps of FIGS. 3-4 across the plurality of servers hosting the distributed application.

The database server 502 includes an operating system 630 and a database management system (DBMS) 610, which hosts one or more databases. The Database Management System (DBMS) 610, in the preferred embodiment, is implemented using conventional SQL compliant relational database management (RDBMS) software such as those available from IBM of Armonk, N.Y.; Microsoft of Redmond, Wash.; Oracle of Redwood Shores Calif.; and the like. The DBMS 610 operates to create, maintain, update, query and otherwise control data stored in data tables, which form the one or more databases. Database server 502 may also include search software 611, RPS indexes 612 (e.g., indexes configured for restricted party screening) and RPS tables 613. The RPS tables 613 contain data related to a plurality of restricted parties being screened.

RPS server 504 includes an operating system 630, a Global Assembly Cache 640 and RPS component code 645. Similarly, application server 506 comprises application software 642, operating system 630 and server hardware 620. Finally, client computers 510 include operating system 630, client hardware 621 and may optionally include a web browser 644 depending on the type of interface the particular client 510 uses to interface with application server 502. The client computers 510 have access to the RPS system 500 via network 508 such as, the Internet, an intranet LAN or WAN connection or a combination thereof.

Figure 7:
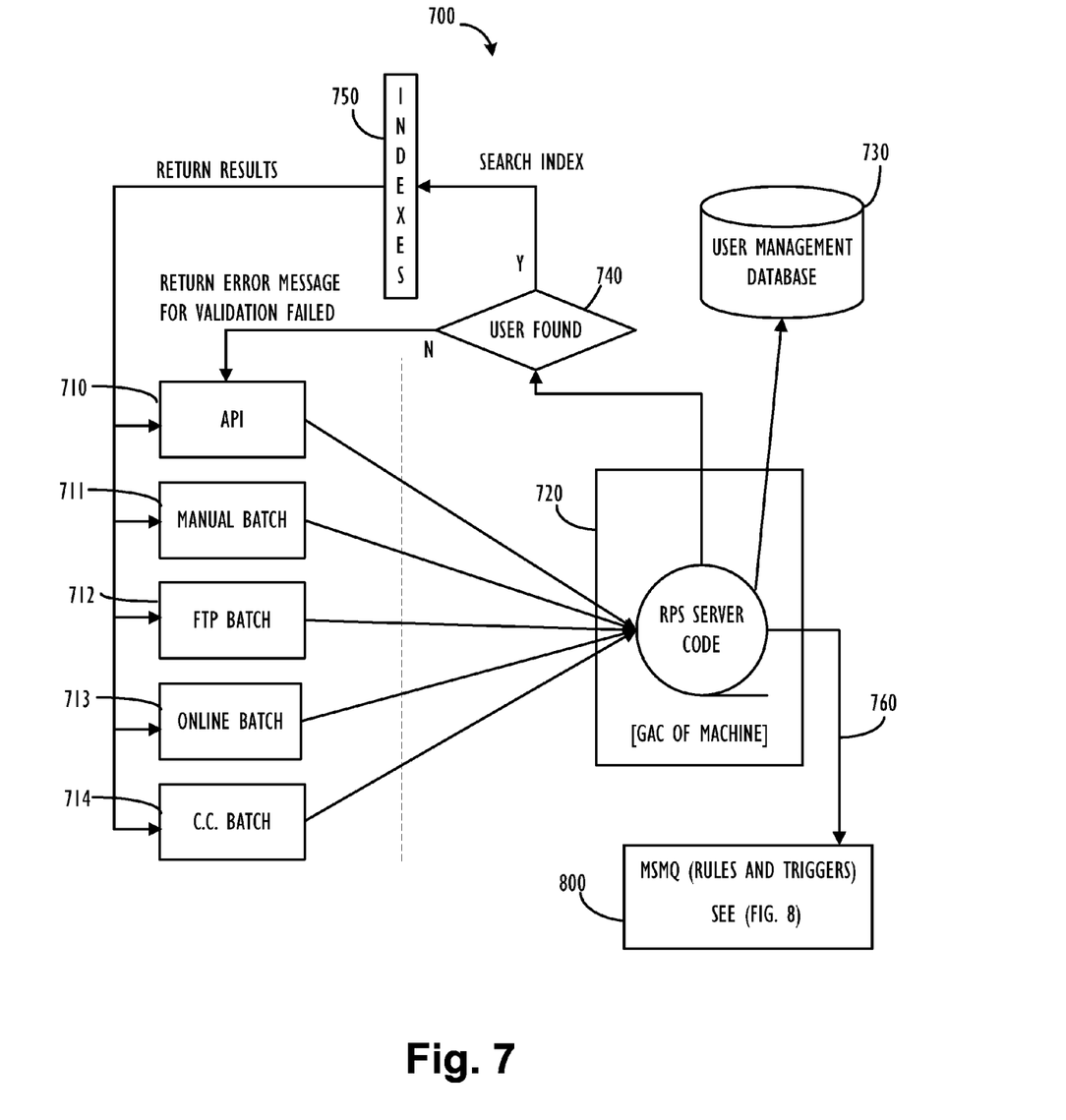
FIGS. 7-8 show, in block diagram form, a system 700 configured according to a preferred embodiment of a RPS distributed application implementation.

Referring now to FIG. 7, RPS system 700 is shown as an example embodiment to support the preferred embodiment of process 400. Input interfaces to the RPS system 700 include an application program interface (API) 710, a manual batch interface 711, a file transfer protocol (FTP) batch interface 712, an online batch interface 713, and a Compliance Component (C.C.) batch interface 714. Each of these interface types provide for different style user requests to be sent to RPS system 720. For example, the client may make a single request or provide a formatted data file as part of the request (e.g., spreadsheet file) for multiple requests. Upon receipt, the RPS system 720 can access a user management database 730 and, if a user is found (Yes prong of 740), perform an indexed search 750 to quickly respond to the requesting program. If a user is not found (No prong of 740) an error message may be returned to indicate validation failure.

The RPS 720 comprises a programming class object that is defined to generically characterize the properties of a customer and their data search request based on the information passed from one of multiple available product interfaces 710-714. The RPS class can reside within the global assembly cache (GAC) of a computer and consists of all the field, property, class, method and logical components required to characterize a customer and customer search request including search post processing requirements. The programming class object may further contain information pertaining to: customer and search validity checking, facilitate the processing of the associated search, return the subsequent search result(s) and ensure that all post-processing prescribed as part of the request is performed. Included in RPS logic are methods for identifying when search post-processing is required which results in the instantiation of a programming sub-class (with logic for performing the post-processing tasks) that can be securely and efficiently passed to a message queue as a binary serialized packet object as indicated by arrow 760. Thus the binary serialized packet may be thought of as containing self referencing encapsulated program logic.

Figure 8:
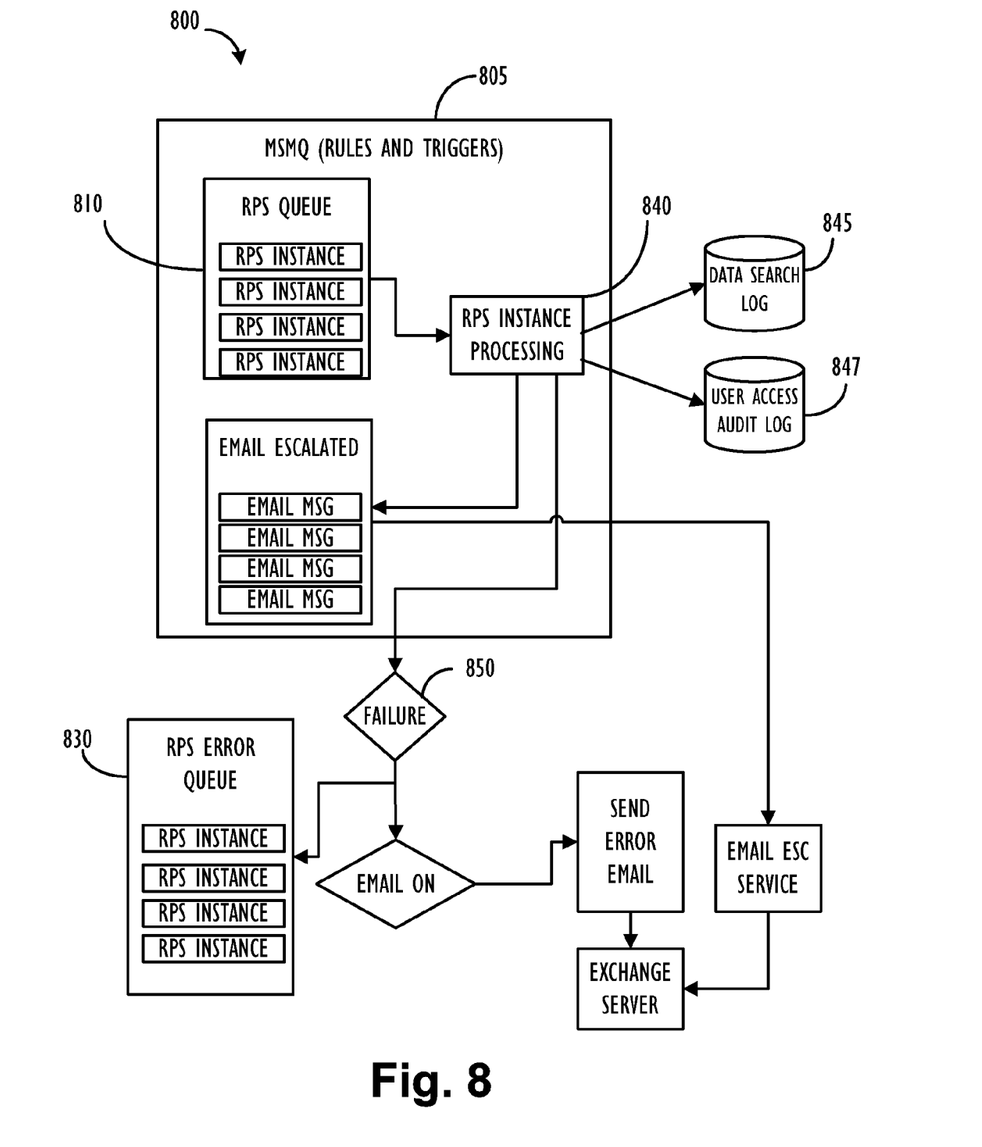

Referring now to FIG. 8, a block diagram 800 shows details of MSMQ Rules and Triggers 805. A binary serialized object is included in the RPS queue 810 and can be extracted (by either a program or a process invoked via trigger rules and other mechanisms) for processing as an RPS instance 840. While processing, access can be made available to data search log 845 and user access audit log 847. Furthermore, email notifications of processing may be facilitated to inform users and administrators of system activity. Generally message queues access and process queued messages and once processed, either successfully or with failure, the queued message is removed from the queue. Because the message is removed, there may be no opportunity to re-queue the object or special effort to recover from a failed activity may be required. In this embodiment (using a message queue trigger service for a queue), upon a first failure (850) to successfully process a queued message object, the queued object can be redirected to a secondary queue (RPS Error queue 830) for another opportunity for successful processing. This embodiment of RPS differs from typical designs which often use a queue listener application to listen for and intervene in the processing of queued objects. On the secondary queue (RPS Error queue 830), instead of simply processing queued objects and implementing an automatic resend operation for objects that fail to execute successfully, the programming logic is used to implement a process that accesses queued RPS objects while not automatically resulting in their removal from the queue. The process inspects a queued RPS packet object, attempts to execute and process the logic of the object, detects if the object execution fails and, in the case of failed execution, retains the object within the resend queue (RPS Error queue 830) for subsequent attempts at successful processing. In a preferred embodiment, the recovery processing queue (as shown above in FIG. 4A) can be implemented with a second "listener" style program or require operator intervention to ensure proper notification to administrators of the systems initial processing failure (regarding initial processing). Therefore, this embodiment may provide that only successfully processed messages are removed from the resend queue. In other words, rather than simply being processed as a typical message received from a message queue, a separate process (including a process invoked by a message queue trigger rule) can scan the failover message queue to seek and identify selected queue objects and invoke the methods within the object to run and monitor the RPS component while not removing the object or message from the queue until successful processing is completed.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 3-4 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 3-4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method for operating a network of computer systems having a sending computer system and a receiving computer system configured to communicate with a message passed in a message queue, a data portion of the message including instructions executable by the receiving computer system, the method comprising:

the sending computer system receiving a work request at a first program;

the first program identifying a portion of the work request to be performed by a receiving computer system;

the first program formulating a message for the receiving computer system related to the work request and embedding program logic for the receiving computer system into the data portion of the message;

the first program submitting the message to a message queue associated with communication from the first program to the receiving computer system;

the receiving computer system receiving an indication of a message from the sending computer system for processing at the receiving computer system;

the receiving computer system accessing a data portion of the message utilizing a trigger rule, the trigger rule firing based on an indication that the message is a restricted party screening (RPS) message; and the receiving computer system executing an embedded code portion from the data portion of the message in the context of a process executing on the receiving computer system, wherein executing the embedded code portion is caused by a trigger body associated with the trigger rule without the assistance of a listener application to process the message.

2. The method of claim 1, further comprising:

the first program performing validation of elements of the work request prior to formulating the message.

3. The method of claim 1, further comprising:
the first program waiting for a response from the receiving computer system upon receipt of the message.

4. The method of claim 1, further comprising:
the first program waiting for a response from the receiving computer system upon receipt of the message and completion of the work request.

5. The method of claim 1, wherein the embedded program logic comprises elements selected from the group consisting of: an assembly, a shared library, a binary serialized packet object, and a subroutine.

6. The method of claim 5, wherein the binary serialized packet object can be instantiated by a process on the receiving computer system, the process associated with firing of the trigger rule.

7. The method of claim 1, wherein the sending computer system and the receiving computer system are the same computer system.

8. The method of claim 1, wherein at least one of the sending computer system and the receiving computer system is a virtual machine.

9. A non-transitory computer readable medium or media having computer-executable instructions stored thereon for operating a network of computer systems to perform a method for operating a computer system having a sending computer system and a receiving computer system configured to communicate with a message passed in a message queue, a data portion of the message including instructions executable by the receiving computer system, the method comprising:
the sending computer system receiving a work request at a first program;
the first program identifying a portion of the work request to be performed by the receiving computer system;
the first program formulating a message for the receiving computer system related to the work request and embedding program logic for the receiving computer system into the data portion of the message;
the first program submitting the message to a message queue associated with communication from the first program to the receiving computer system;
the receiving computer system receiving an indication of a message from the sending computer system for processing at the receiving computer system;
the receiving computer system accessing a data portion of the message utilizing a trigger rule, the trigger rule firing based on an indication that the message is a restricted party screening (RPS) message; and
the receiving computer system executing an embedded code portion from the data portion of the message in the context of a process executing on the receiving computer system,
wherein executing the embedded code portion is caused by a trigger body associated with the trigger rule without the assistance of a listener application to process the message.

10. The computer readable medium or media of claim 9, further comprising instructions stored thereon for operating a network of computer systems to perform a method further comprising the first program performing validation of elements of the work request prior to formulating the message.

11. The computer readable medium or media of claim 9, further comprising instructions stored thereon for operating a network of computer systems to perform a method further comprising:
the first program waiting for a response from the receiving computer system upon receipt of the message.

12. The computer readable medium or media of claim 9, further comprising instructions stored thereon for operating a network of computer systems to perform a method further comprising:
the first program waiting for a response from the receiving computer system upon receipt of the message and completion of the work request.

13. The computer readable medium or media of claim 9, further comprising instructions stored thereon for operating a network of computer systems to perform a method wherein the embedded program logic comprises elements selected from the group consisting of: an Assembly, a shared library, a binary serialized packet object, and a subroutine.

14. The computer readable medium or media of claim 9, further comprising instructions stored thereon for operating a network of computer systems to perform a method wherein a binary serialized packet object is instantiated by a process on the receiving computer system, the process associated with firing of the trigger rule.

15. The computer readable medium or media of claim 9, wherein the sending computer system and the receiving computer system are the same computer system.

16. The computer readable medium or media of claim 9, wherein at least one of the sending computer system and the receiving computer system is a virtual machine.

17. A network of computer systems having a sending computer system and a receiving computer system configured to communicate with a message passed in a message queue, a data portion of the message including instructions executable by the receiving computer system, the network of computer systems comprising:
a sending computer configured to execute a first program;
the first program receiving a work request;
the first program identifying a portion of the work request to be performed by the receiving computer system;
the first program formulating a message for the receiving computer system related to the work request and embedding program logic for the receiving computer system into the data portion of the message;
the first program submitting the message to a message queue associated with communication from the first program to the receiving computer system;
the receiving computer system configured to receive an indication of a message from the sending computer system for processing at the receiving computer system;
the receiving computer system configured to access a data portion of the message utilizing a trigger rule, the trigger rule firing based on an indication that the message is a restricted party screening (RPS) message; and
the receiving computer system configured to execute an embedded code portion from the data portion of the message in the context of a process executing on the receiving computer system,
wherein executing the embedded code portion is caused by a trigger body associated with the trigger rule without the assistance of a listener application to process the message.

18. The network of computer systems of claim 17, further comprising:
the first program performing validation of elements of the work request prior to formulating the message.

19. The network of computer systems of claim 17, further comprising:
the first program waiting for a response from the receiving computer system upon receipt of the message.

20. The network of computer systems of claim 17, further comprising:
the first program waiting for a response from the receiving computer system upon receipt of the message and completion of the work request.

21. The network of computer systems of claim 17, wherein the embedded program logic comprises elements selected from the group consisting of: an assembly, a shared library, a binary serialized packet object, and a subroutine.

22. The network of computer systems of claim 21, wherein the binary serialized packet object can be instantiated by the second computer system.

23. The network of computer systems of claim 17, wherein the sending computer system and the receiving computer system are the same computer system.

24. The network of computer systems of claim 17, wherein at least one of the sending computer system and the receiving computer system comprises a virtual machine.

25. A method for operating a network of computer systems having a sending computer system and a receiving computer system configured to communicate with a message passed in a message queue, a data portion of the message including instructions executable by the receiving computer system, the method comprising:
the receiving computer system receiving an indication of a message from a first program executing on a sending computer system;
the receiving computer system accessing a data portion of the message, via a trigger body associated with a trigger rule, the trigger rule firing as a result of receiving an indication that the message is a restricted party screening (RPS) message; and
the receiving computer system executing an embedded code portion of the message in the context of a process executing on the receiving computer system without invoking a listener application to process the message, wherein executing the embedded code portion is caused by the trigger body.

26. The method of claim 25, further comprising:
the receiving computer system formulating a recovery message with embedded code for a recovery queue when the execution of the embedded code portion of the message indicates a non-successful result.

27. The method of claim 25, further comprising:
the receiving computer system formulating a response message for a response queue associated with the sending program to indicate a status of a work request.

28. A non-transitory computer readable medium or media having computer-executable instructions stored thereon for operating a network of computer systems to perform a method having a sending computer system and a receiving computer system configured to communicate with a message passed in a message queue, a data portion of the message including instructions executable by the receiving computer system, the method comprising:
receiving an indication of a message at the receiving computer system from a first program executing on the sending computer system;
the receiving computer system accessing a data portion of the message, via a trigger body associated with a trigger rule, the trigger rule firing as a result of receiving an indication that the message is a restricted party screening (RPS) message; and
the receiving computer system executing an embedded code portion of the message in the context of a process executing on the receiving computer system, wherein executing the embedded code portion does not require execution of a listener application to process the message,
wherein executing the embedded code portion is caused by the trigger body.

29. The computer readable medium or media of claim 28, further comprising instructions stored thereon for operating a network of computer systems to perform a method further comprising:
the receiving computer system formulating a recovery message with embedded code for a recovery queue when the execution of the embedded code portion of the message indicates a non-successful result.

30. The computer readable medium or media of claim 28, further comprising instructions stored thereon for operating a network of computer systems to perform a method further comprising:
the receiving computer system formulating a response message for a response queue associated with the first program to indicate a status of a work request.

31. A network of computer systems having a sending computer system and a receiving computer system configured to communicate with a message passed in a message queue, a data portion of the message including instructions executable by the receiving computer system, the network of computer systems comprising:
the receiving computer system configured to receive an indication of a message from a first program executing on a sending computer system;
the receiving computer system configured to process a message from the first program;
the receiving computer system configured to access a data portion of the message utilizing a trigger rule, the trigger rule firing based on an indication that the message is a restricted party screening (RPS) message; and
the receiving computer system configured to execute an embedded code portion from the data portion of the message in the context of a process executing on the receiving computer system,
wherein executing the embedded code portion is caused by a trigger body associated with the trigger rule without the assistance of a listener application to process the message.

32. The network of computer systems of claim 31, further comprising:
the receiving computer system configured to formulate a recovery message with embedded code for a recovery queue when the execution of the embedded code portion of the message indicates a non-successful result.

33. The network of computer systems of claim 31, further comprising:
the receiving computer system configured to formulate a response message for a response queue associated with the first program to indicate a status of a work request.

34. A computer system for performing restricted party screening of an export request, the computer system comprising:
an application server;
a database server coupled to the application server; and
a restricted party screening server coupled to the application server and the database server;
at least one of the application server, database server and restricted party screening server configured to execute a portion of a distributed application, the distributed application configured to execute on a sending computer system and a receiving computer system which communicate at least in part via message queues;

wherein the sending computer system of the distributed application is configured to receive a work request;

wherein the sending computer system is configured to identify a portion of the work request to be performed by a receiving computer system of the distributed application;

wherein the sending computer system is configured to formulate a message for the receiving computer system related to the work request and embed program logic for the receiving computer system into the data portion of the message;

wherein the sending computer system is configured to submit the message to a message queue associated with communication from the sending computer system to the receiving computer system;

wherein the receiving computer system of the distributed application is configured to receive the message from the sending computer system;

wherein the receiving computer system is configured to access a data portion of the message; and wherein the receiving computer system is configured to execute an embedded code portion of the message in the context of a process executing on the receiving computer system, the process associated with firing of a trigger rule, the trigger rule firing based on an indication that the message is a restricted party screening (RPS) message;

wherein executing the embedded code portion is caused by a trigger body associated with the trigger rule without the assistance of a listener application to process the message.

35. A method of operating a computer system configured to receive messages passed in a message queue, the method comprising:

the computer system receiving an indication of a message in a first message queue;

the computer system determining a defined trigger rule to be true for the message, the trigger rule indicating that the message is a restricted party screening (RPS) message; and the computer system firing a trigger body associated with the trigger rule, wherein the trigger body contains logic for instantiating an object embedded in the data portion of the message and for invoking a method in the data portion of the message, and wherein instantiating the object embedded in the data portion of the message does not invoke a listener application to process the message.

36. The method of operating a computer system of claim 35 further comprising:

the computer system submitting substantially the same message to a second message queue when the processing of the invoked method detects an error condition.

37. A computer system configured to receive messages passed in a message queue, the computer system comprising:

message queuing software comprising trigger rules;

wherein the message queuing software is configured to determine a defined trigger rule to be true for a type of received message, the trigger rule indicating that the received message is a restricted party screening (RPS) message; and wherein a trigger body associated with the trigger rule contains logic for instantiating an object embedded in the data portion of the received message and for invoking a method in the data portion of the received message without invoking a listener application to process the message.

38. A non-transitory computer readable medium or media having computer-executable instructions stored thereon for operating a computer system to perform a method to receive messages passed in a message queue, the method comprising:

the computer system receiving an indication of a message in a first message queue;

the computer system determining a defined trigger rule to be true for the message, the trigger rule indicating that the message is a restricted party screening (RPS) message; and the computer system firing a trigger body associated with the trigger rule wherein the trigger body contains logic for instantiating an object embedded in the data portion of the message and for invoking a method in the data portion of the message without invoking a listener application to process the message.

39. The computer readable medium or media or claim 38, further comprising instructions stored thereon for operating a computer system to perform a method further comprising:

the computer system submitting substantially the same message to a second message queue when the processing of the invoked method detects an error condition.

* * * * *